United States Patent [19]

Terui et al.

[11] Patent Number: 5,684,527
[45] Date of Patent: Nov. 4, 1997

[54] ADAPTIVELY CONTROLLED MULTIPOINT VIDEOCONFERENCING SYSTEM

[75] Inventors: Yuichi Terui; Toshiaki Usui, both of Kawasaki, Japan

[73] Assignee: Fujitsu Limited, Kawasaki, Japan

[21] Appl. No.: 88,336

[22] Filed: Jul. 9, 1993

[30] Foreign Application Priority Data

Jul. 28, 1992 [JP] Japan ................................. 4-201176

[51] Int. Cl.$^6$ ................................................. H04N 7/15
[52] U.S. Cl. ........................... 348/15; 348/17; 379/202; 370/260
[58] Field of Search ........................... 348/13, 14, 15, 348/16, 17, 18, 19, 20; 379/96, 94, 202, 203, 204, 206; 370/62, 260, 263, 264, 265, 266; H04N 7/14, 7/15

[56] References Cited

U.S. PATENT DOCUMENTS

| 4,449,238 | 5/1984 | Lee et al. ........................ 348/16 |
| 4,494,144 | 1/1985 | Brown ........................... 348/420 |
| 4,965,819 | 10/1990 | Kannes ........................... 348/15 |
| 5,003,532 | 3/1991 | Ashida et al. .................... 370/62 |

FOREIGN PATENT DOCUMENTS

| 0146083 | 7/1986 | Japan ..................... H04N 7/14 |
| 0043285 | 2/1987 | Japan ..................... H04N 7/14 |
| 0209985 | 9/1987 | Japan ..................... H04N 7/14 |
| 0086686 | 4/1988 | Japan ..................... H04N 7/14 |
| 63-309034 | 12/1988 | Japan . |
| 0235492 | 9/1990 | Japan ..................... H04N 7/15 |
| 4-063084 | 2/1992 | Japan . |

OTHER PUBLICATIONS

Mounts, F.W., "A Video Encoding System With Conditional Picture–Element Replenishment," *The Bell System Technical Journal*, vol. 48, No. 7, Sep. 1969, pp. 2545–2554.

*Primary Examiner*—Stella Woo
*Attorney, Agent, or Firm*—Staas & Halsey

[57] ABSTRACT

In a multipoint videoconferencing system including a plurality of visual telephone terminals and a multipoint control unit (MCU) connected thereto, shares of the respective visual telephone terminals are determined in the MCU, based on determination of a speaker determined from voice levels and/or amount of movement in the respective visual telephone terminals. The respective telephone terminals generate pictures at picture rates defined by the respective shares, and generate video data from the pictures at data rates defined by the respective shares. Video data generated in each visual telephone terminal are multiplexed in time division multiplexer in the MCU, and are distributed to the other terminals.

35 Claims, 16 Drawing Sheets

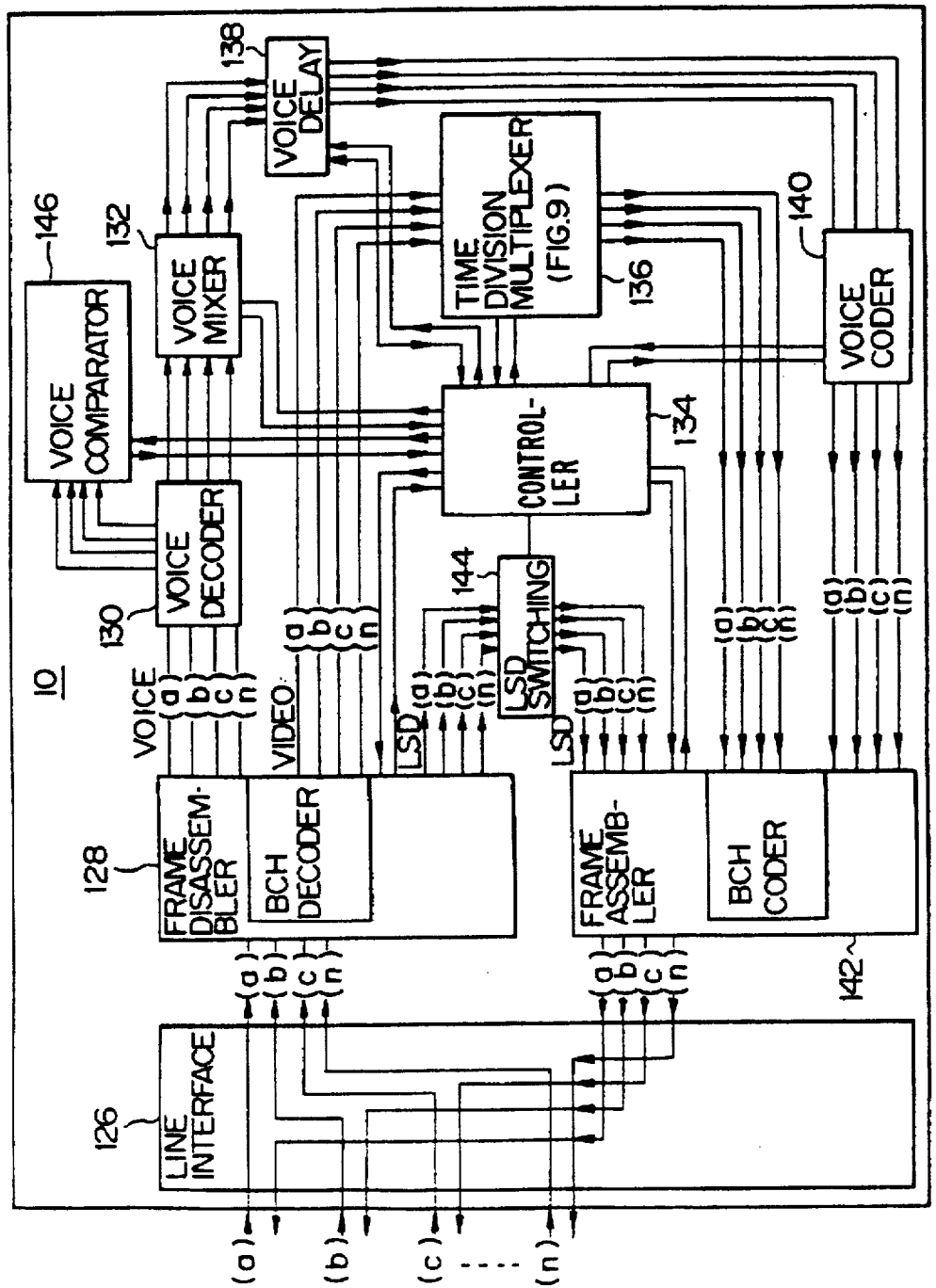

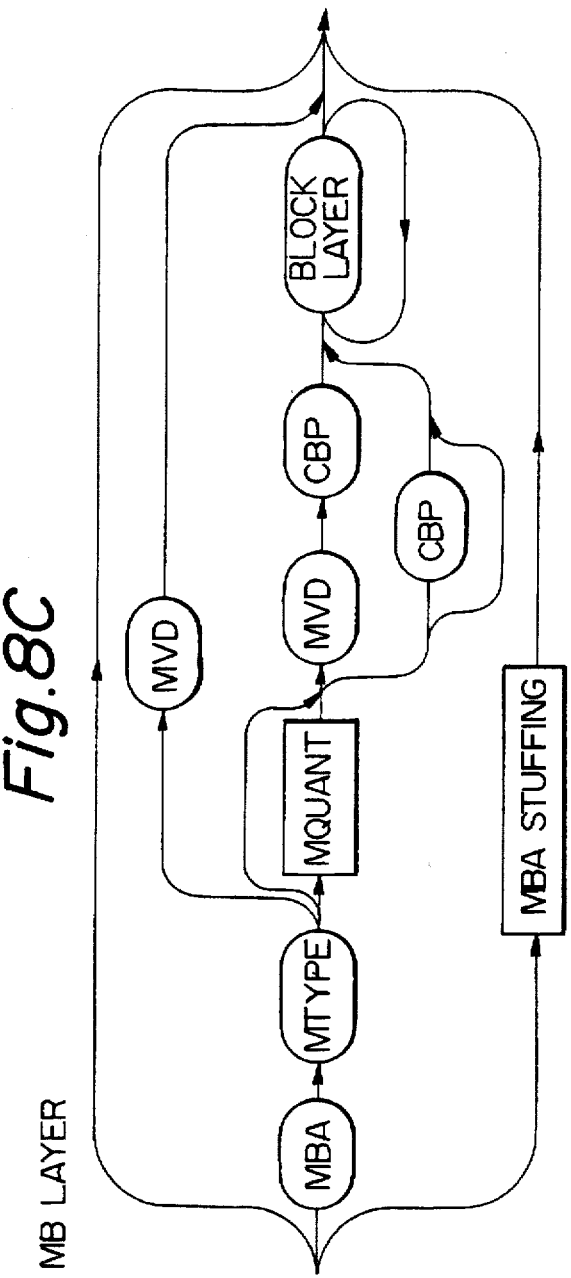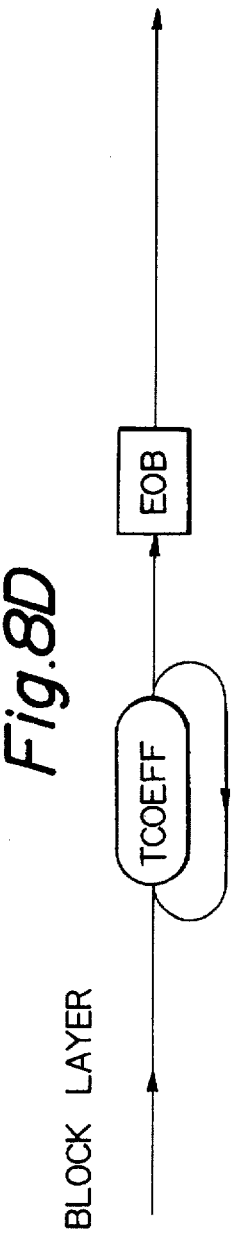

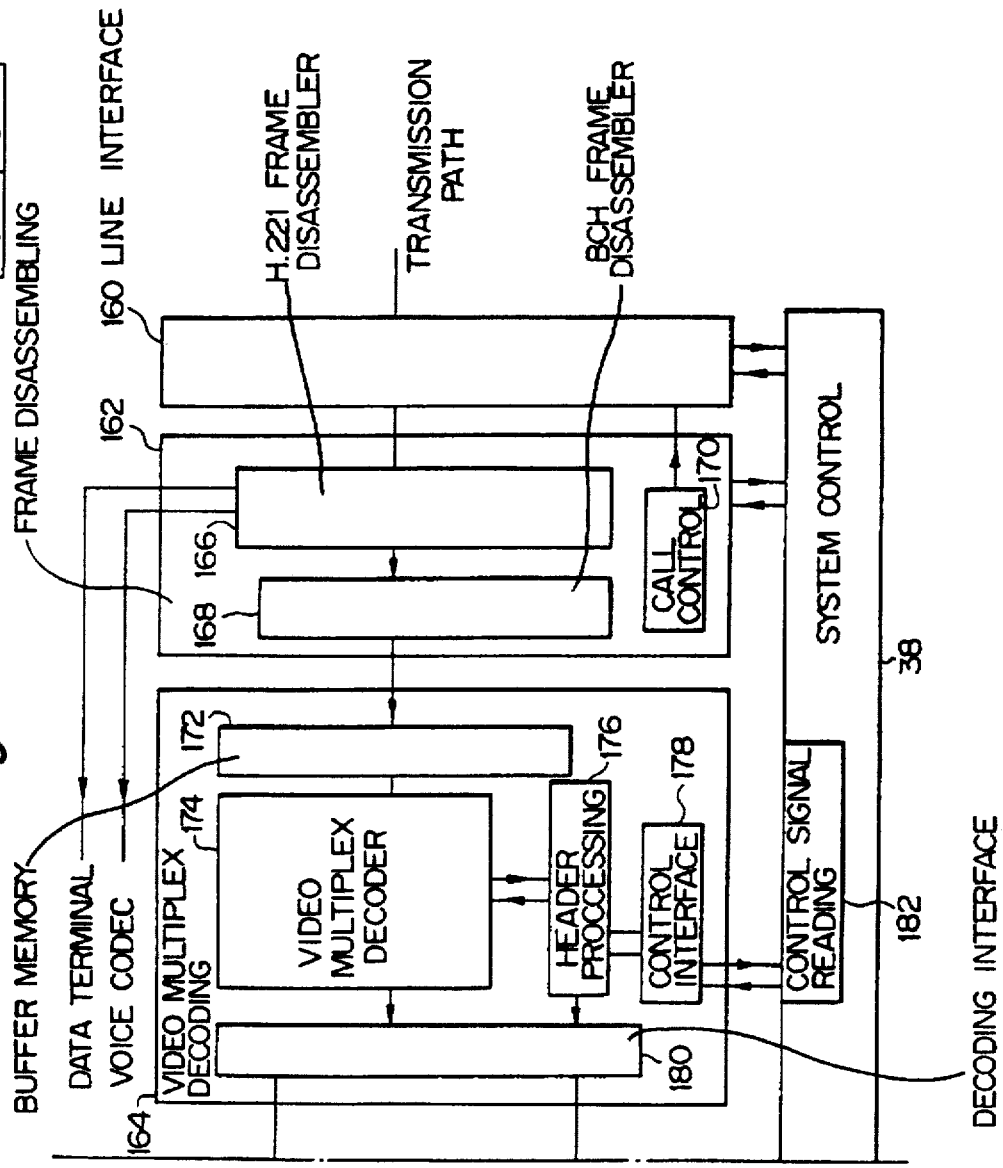

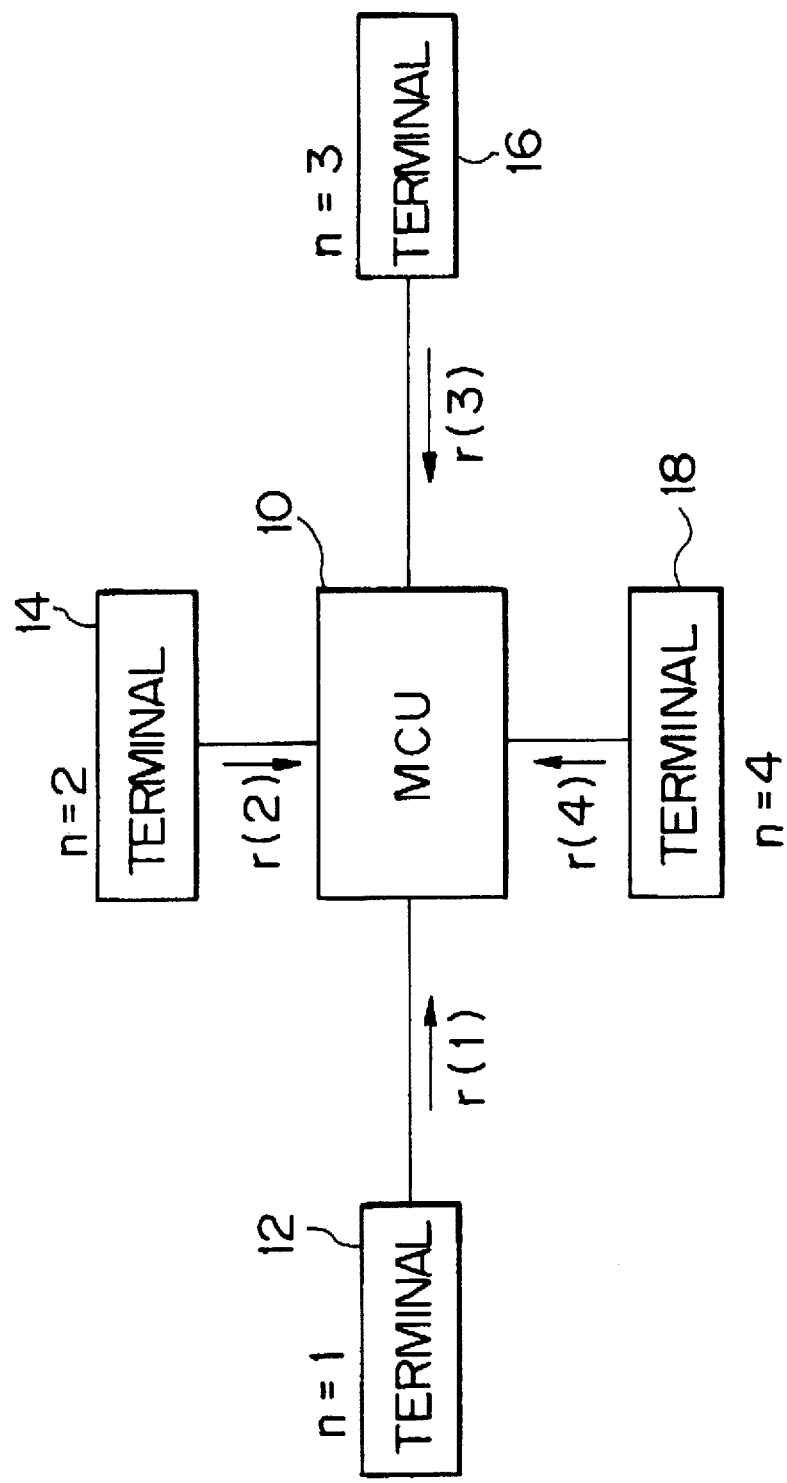

Fig.12

| SHARE Ai | PICTURE RATE [SEC$^{-1}$] |
|---|---|
| LESS THAN 0.1 | 1 |
| 0.1 ~ 0.2 | 3 |
| 0.2 ~ 0.3 | 6 |
| 0.3 ~ 0.4 | 9 |
| 0.4 ~ 0.5 | 12 |
| 0.5 ~ 0.6 | 15 |
| 0.6 ~ 0.7 | 18 |
| 0.7 ~ 0.8 | 21 |
| 0.8 ~ 0.9 | 24 |
| 0.9 ~ 1.0 | 27 |
| 1.0 | 30 |

ADAPTIVELY CONTROLLED MULTIPOINT VIDEOCONFERENCING SYSTEM

BACKGROUND OF THE INVENTION

1. Field of the Invention

The present invention relates to a method of adaptively controlling a multipoint videoconferencing system and to the adaptively controlled multipoint videoconferencing system.

2. Description of the Related Art

CCITT (the International Telegraph and Telephone Consultative Committee) recommended standardization of terminal equipment for use in audiovisual teleservices (CCITT recommendations H.221, H.230, H.242, H.261 and H.320), and visual telephone terminals have been developed conforming to recommendations. MCU's (Multipoint Control Units) have also been developed to realize an efficient multipoint videoconferencing by controlling a plurality of visual telephone terminals through a communication network.

In one type of the developed multipoint videoconferencing system including the MCU and the visual telephone terminals, the MCU determines a point (i.e., a location) where a speaker exists, based on existence of voice data from that point, and distributes a picture of the speaker taken at that point, to other points. A picture taken at a point where a person who has previously been a speaker exists, is distributed to the point where the speaker exists. Regarding voice data, voices are mixed together so that each point can receive voices from the other points, and the mixed voices are transmitted to each point.

As mentioned above, as far as the video data are concerned, the MCU serves as a mere selector. Since only one of the speaker and the previous speaker is displayed on a television receiver at each point, the conference is short of presence of participants of the conference, for example, because reactions such as approval or disapproval of other participants in response to a statement of the speaker cannot be seen.

Japanese Unexamined Patent Publication (Kokai) No. 4-63084 discloses a multipoint videoconferencing system wherein composite pictures of a plurality of points are distributed to each terminal. The composite pictures are made by reproducing pictures in an MCU and by combining the reproduced pictures in the MCU. Each terminal does not receive video data of full pictures of the other points, but receives data of composite picture. Therefore, modification of the composite picture, such as change of a ratio of sizes of displayed persons and rearrangement of the displayed persons, is not allowed in each terminal. In addition, the amount of the video data is not adaptively controlled so that a speaker and/or a person strongly reacting to the speaker cannot be more vividly displayed than others.

Japanese Unexamined Patent Publication (Kokai) No. 63-309034 discloses a multipoint videoconference system wherein each terminal receives data of full pictures of the other points using satellite communication. The disclosed system requires a large communication capacity in order to transfer data of a plurality of full pictures.

SUMMARY OF THE INVENTION

It is an object of the present invention to provide a method of realizing a multipoint videoconferencing system that provides sufficient presence, while nevertheless using only a limited transmission capacity.

It is another object of the present invention to provide a multipoint videoconferencing system that provides sufficient presence, while nevertheless using only a limited transmission capacity.

In accordance with the present invention, there is provided a method of adaptively controlling a multipoint videoconferencing system including a plurality of visual telephone terminals and a multipoint control unit connected to the visual telephone terminals, comprising the step of:

a) determining shares of the respective visual telephone terminals;

b) generating video data in the respective visual telephone terminals according to the determined shares of visual telephone terminals; and c) distributing the video data generated in each of the visual telephone terminals to the other visual telephone terminals.

In accordance with the present invention, there is also provided a multipoint videoconferencing system including a plurality of visual telephone terminals and a multipoint control unit connected to the visual telephone terminals, comprising:

means for determining shares of the respective visual telephone terminals;

means for generating video data in the respective visual telephone terminals according to the shares of visual telephone terminals determined by the determining means; and means for distributing the video data generated by the generating means in each of the visual telephone terminals to the other visual telephone terminals.

In accordance with the present invention, there is also provided a visual telephone terminal for use in a multipoint videoconferencing system including a multipoint control unit connected to the visual telephone terminal and other visual telephone terminals connected to the multipoint control unit comprising:

means for receiving a share determined in the multipoint control unit;

means for generating video data according to the share received by the receiving means;

means for transmitting the video data generated by the generating means to the multipoint control unit; and means for receiving video data generated in the other visual telephone terminals and multiplexed in the multipoint control unit, from the multipoint control unit.

In accordance with the present invention, there is also provided a multipoint control unit for use in a multipoint videoconferencing system including a plurality of visual telephone terminals connected thereto, comprising:

means for determining shares of the respective visual telephone terminals;

means for transmitting the shares to the respective visual telephone terminals;

means for receiving video data generation of which accords to the shares of the respective visual telephone terminals, from the visual telephone terminals; and means for distributing video data received from each visual telephone terminal to the other visual telephone terminals.

BRIEF DESCRIPTION OF THE DRAWINGS

FIG. 4 is a diagram showing a positional orientation of FIG. 4A and FIG. 4B;

FIG. 7 is a block diagram showing a detailed construction of the MCU 10 of FIG. 1;

FIGS. 8A to 8D are diagrams showing a hierarchical structure of video data, conforming to the H.261 recommendation;

FIG. 10 is a diagram showing a positional orientation of FIG. 10A and FIG. 10B;

FIG. 10A and FIG. 10B are block diagrams showing a construction of a decoder side of the codec 26 of FIG. 1;

FIG. 11 is a diagram explaining determination of shares $a_i$;

FIG. 12 is a diagram explaining determination of picture rates from the shares $a_i$;

DESCRIPTION OF THE PREFERRED EMBODIMENTS

Figure 1:
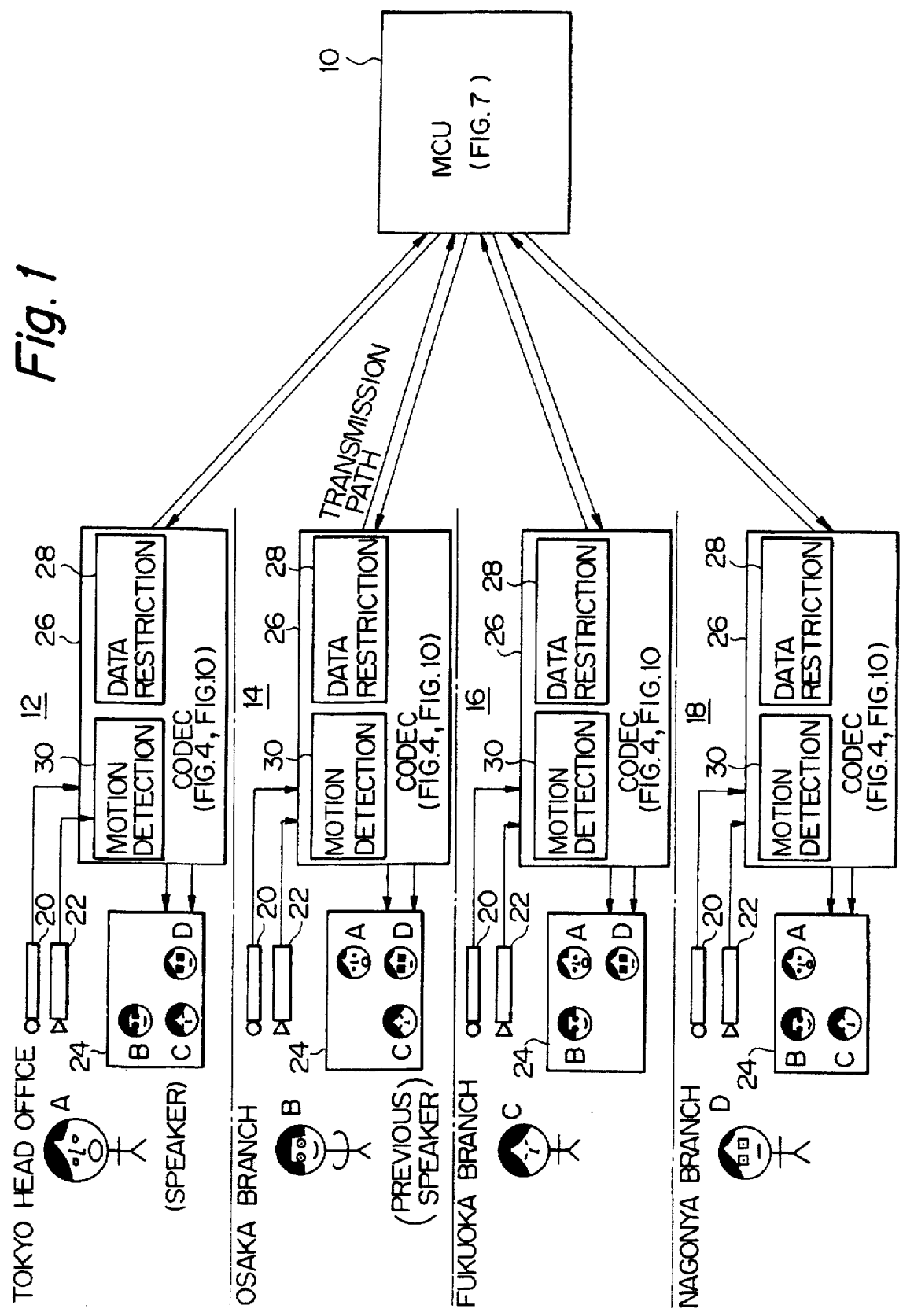
FIG. 1 is a block diagram showing a general construction of a multipoint videoconferencing system according to the present invention.

FIG. 1 shows a general construction of a multipoint videoconferencing system according to the present invention.

The multipoint videoconferencing system includes a multipoint control unit (MCU) 10 and a plurality of visual telephone terminals 12, 14, 16 and 18 each connected through a transmission path to the MCU 10. Each of the visual telephone terminals 12, 14, 16 and 18 includes a microphone 20, a television camera 22, a television receiver 24 and a codec 26. The television receiver 24 is provided with a speaker (not shown).

In a first aspect of the present invention, the codec 26 is provided with a data restriction means 28 for controlling a frequency of occurrence of moving pictures and for controlling an amount of coded video data generated in coding of the pictures. In a second aspect of the present invention, the codec 26 is further provided with a motion detection means 30 for detecting an amount of motion of a person at each point.

Figure 2:
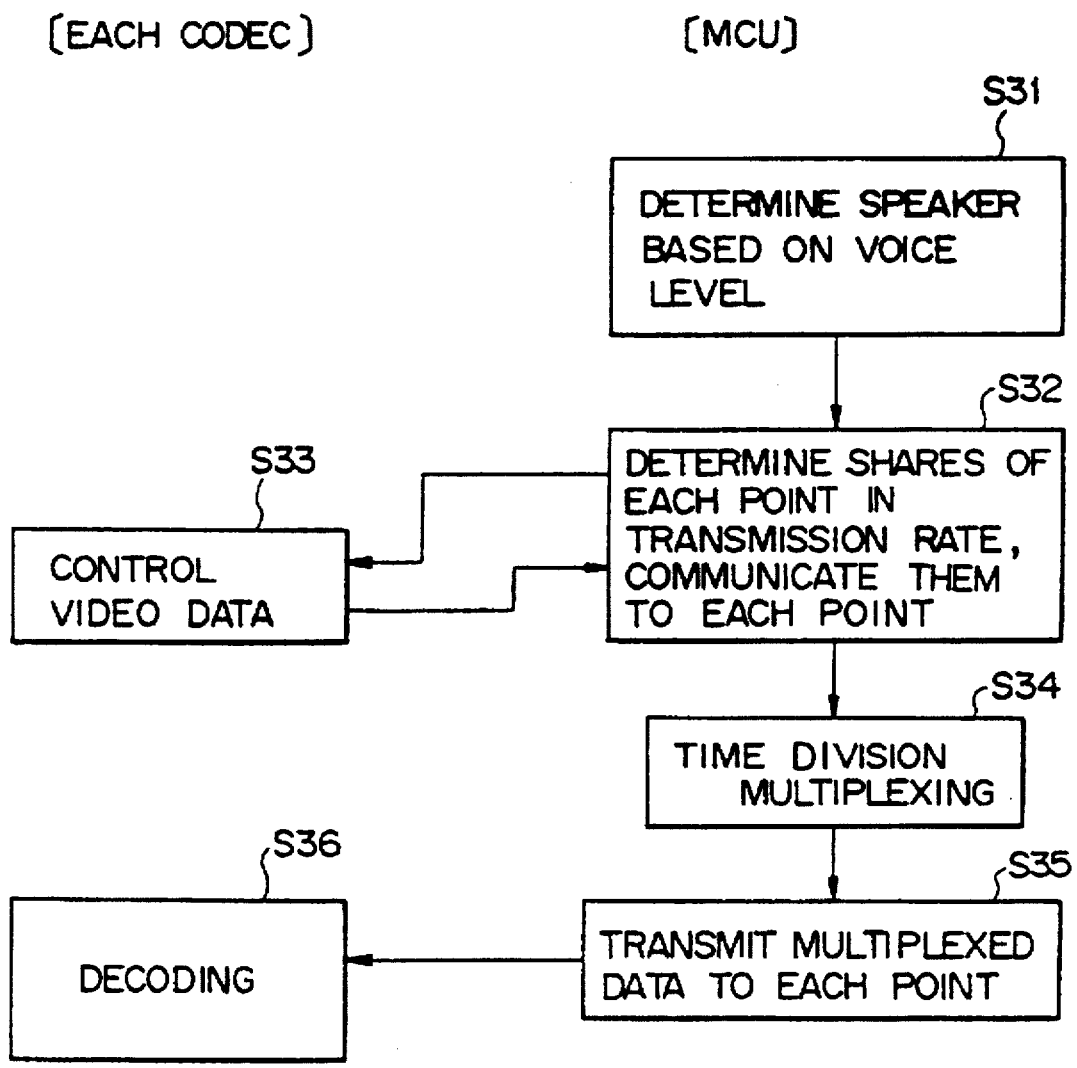
FIG. 2 is a flow diagram showing an operation of the multipoint videoconferencing system according to the first aspect of the present invention.

FIG. 2 shows an operation of the multipoint videoconferencing system in the first aspect of the present invention. In step S31, the MCU 10 determines a speaker (or a point where the speaker exists) by comparing levels of voices made at each point. In step S32, the MCU 10 determines shares of every point in a rate of transmitted video data, based on the determination of the speaker, and transmits values of the shares in the transmission rate to each terminal. Upon receiving the values, visual telephone terminals 12, 14, 16 and 18 control frequencies of occurrence of pictures within a unit time (picture rates), control amounts of coded video data (video data rates), according to the share values, and transmit the coded video data to the MCU 10, in step S33. In step S34, the MCU 10 applies appropriate time division multiplexing to the video data from the visual telephone terminals, and in step S35, transmits the multiplexed video data to each terminal. The codec 26 in each terminal decodes the multiplexed video data received from the MCU 10 in order to display pictures on the television receiver 24.

With the above construction and operation, each visual telephone terminal at each point can display persons at the other points on the television receiver 24. For example, as shown in FIG. 1, assume that the visual telephone terminals 12, 14, 16 and 18 are installed in a Tokyo head office, Osaka branch office, Fukuoka branch office, and Nagoya branch office, respectively, and that Mr. A, Mr. B, Mr. C, and Mr. D participate in a conference in the Tokyo head office, Osaka branch office, Fukuoka branch office, and Nagoya branch office, respectively. And, assume that the current speaker is Mr. A and the previous speaker is Mr. B. Then, on a television receiver 24 of the visual telephone terminal 12 in the Tokyo head office, listeners B, C and D, but not A, are displayed. On a television receiver 24 of the visual telephone terminal 14 in the Osaka branch office, A, C and D, but not B, are displayed, and the current speaker A is more vividly displayed and preferably displayed larger than others. On a television receiver 24 in the Fukuoka branch office, A, B and D, but not C, are displayed, and the current speaker A is more vividly displayed and preferably displayed larger than others. On a television receiver 24 in the Nagoya branch office, A, B and C, but not D, are displayed, and the current speaker A is more vividly displayed and preferably displayed larger than others.

Since a larger share of information, e.g., a picture rate of 15 times per second and a data rate that is one half of total transmission rate assigned to video data, is occupied by video data of the current speaker, and a smaller share of information, e.g., a picture rate of 7.5 times per second and a data rate that is a quarter of the total transmission rate, is occupied by video data of the listener and the previous speaker, speaking motion and gestures of the speaker can be clearly seen while reactions of the other persons can also be seen.

In the first aspect of the present invention, an amount of information (picture rate and data rate) is determined based on whether the person is a speaker or not. However, there is a case where it is not appropriate to determine the amount of information based only on whether the person is a speaker or not. For example, when a videoconference is held among four points as shown in FIG. 1, assume that Mr. A at the Tokyo head office is speaking, and Mr. B at the Osaka branch office, Mr. C at the Fukuoka branch office, and Mr. D at the Nagoya branch office are listening to the speaker. If Mr. D at the Nagoya branch office made a larger reaction, the video conference among the four points would be more realistic by assigning a larger amount of information to Mr. D than Mr. C at the Fukuoka branch who made a smaller reaction.

Therefore, in the second aspect of the present invention, amounts of motion of participants are detected in each codec, and the picture rate and the data rate of the coded video data are adaptively controlled in response to the amounts of motion detected in all of terminals.

Figure 3:
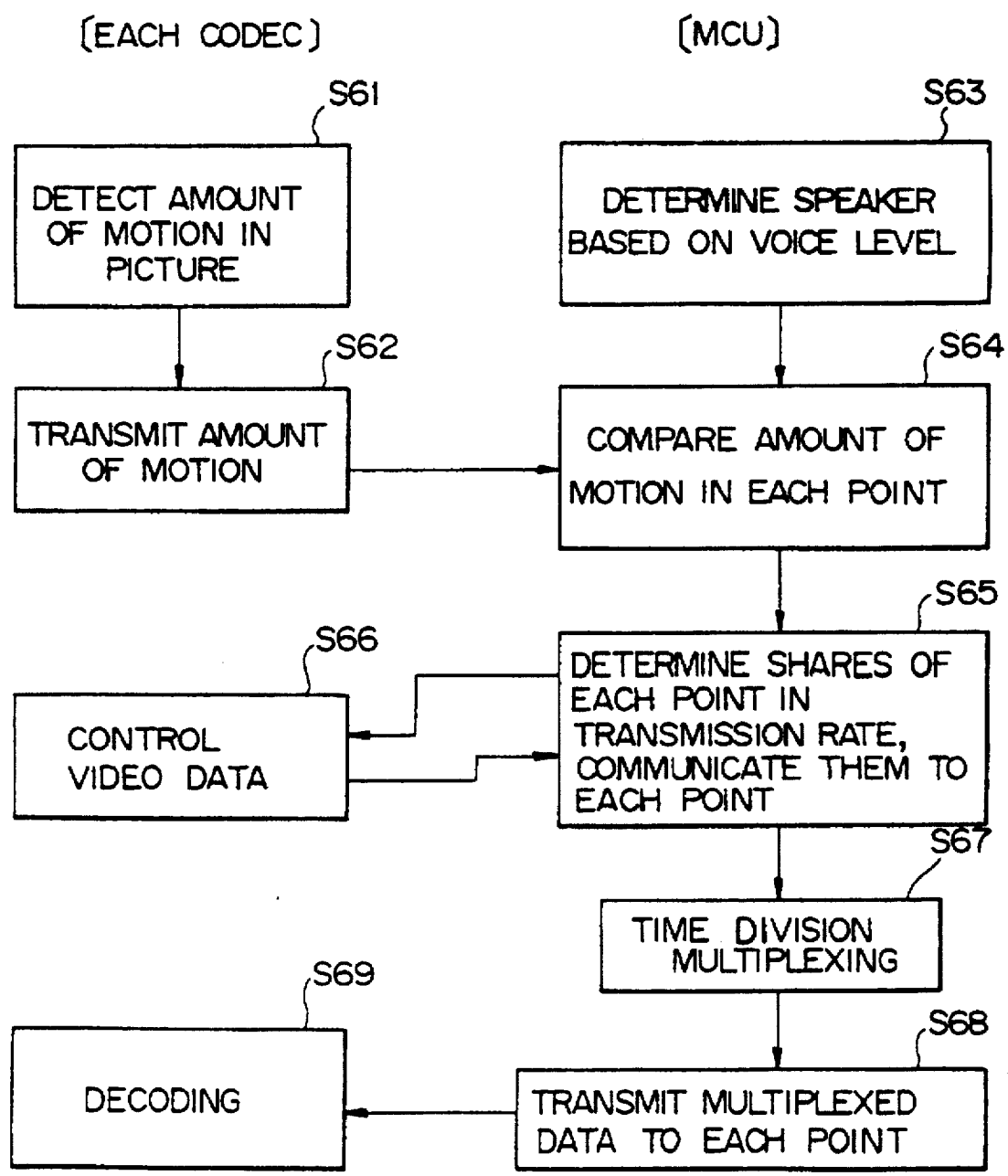
FIG. 3 is a flow diagram showing an operation of the multipoint videoconferencing system according to the second aspect of the present invention.

FIG. 3 shows an operation of the multipoint video conferencing system in the second aspect of the present invention. In step S61, the motion detection means 30 in each codec 26 detects an amount of motion in a picture, for example, by calculating picture-to-picture differences, and in step S62, the detected amount of motion is transmitted from the codec 26 to the MCU 10. On the other hand, the MCU 10 determines a speaker (or a point where the speaker exists) by comparing voice levels in each point, in step S63. In step S64, the MCU 10 determines a person making a larger reaction by comparing the amount of motion transmitted from each of the codecs. In step S65, the MCU 10 determines shares of each point in transmission rate based on the determination of the speaker and/or amount of motion at every point, and transmits the share values to all of the visual telephone terminals. Upon receiving the share values, the visual telephone terminals control picture rates and video data rates according to the share data, and transmit coded video data to the MCU 10, in step S66. In step S67, the MCU 10 applies appropriate time division multiplexing to the video data sent from the visual telephone terminals, and in step S68, transmits the multiplexed video data to the visual telephone terminals. In step S69, the codec 26 in each visual telephone terminal decodes the multiplexed video data into pictures to be displayed on the television receiver 24.

Figure 4A:
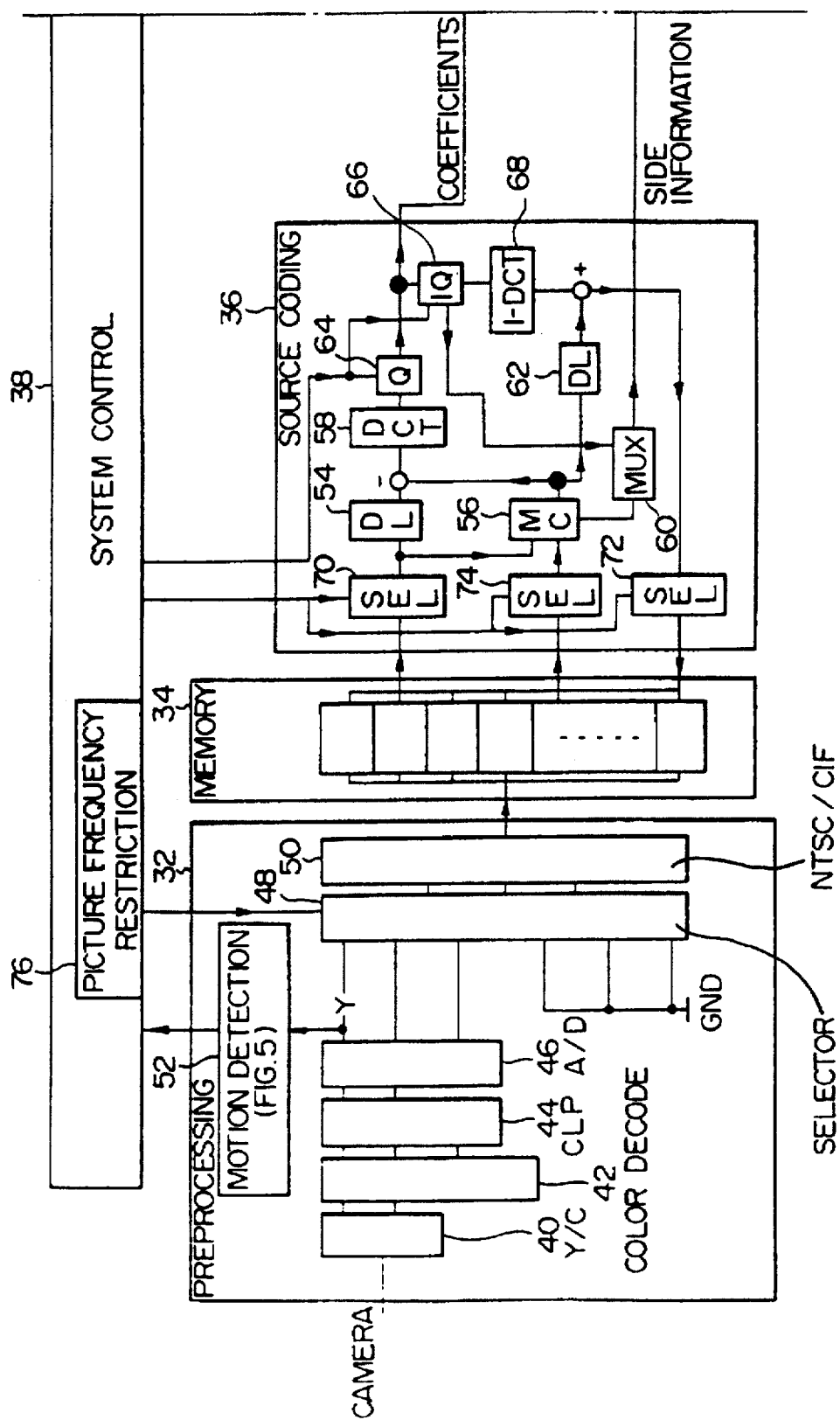
FIGS. 4A and 4B are block diagrams showing a construction of a coder side of the codec 26 of FIG. 1.

FIG. 4 shows a detailed construction of a coder side of the codec 26 according to the present invention. FIG. 4A shows a preprocessing part 32, a memory part 34, and a source coding part 36, which are included in the coder side of the codec 26. FIG. 4A also shows a part of system control unit 38 which is included in the codec 26. The preprocessing part 32 includes: a Y/C separation circuit 40 for separating a luminance signal and a color signal; a color decode circuit 42 for separating the color signal into two color difference signals to output the luminance signal and the two color difference signals; a clamp circuit 44 for clamping the outputs of the color decode circuit 42; an analog to digital (A/D) conversion circuit 46; a selector 48; and an NTSC/CIF conversion circuit 50 for converting NTSC (National Television System Committee) form into CIF (Common Intermediate Format). An output of the A/D converter 46 is input to one input of the selector 48, and another input of the selector 48 is grounded.

The preprocessing part 32 further includes a motion detection unit 52. As described in detail later, the motion detection unit 52 calculates a sum of picture-to-picture differences over a picture in successive pictures, and quantizes the sum into 1 to 10 levels using values stored in a table in advance. In an embodiment shown in FIG. 4A, the motion detection unit 52 calculates the picture-to-picture differences from digital signals output from the A/D conversion circuit 46, but it may be possible to construct the motion detection unit 52 so as to calculate the picture-to-picture differences from analog signals. The quantized value representing the amount of motion is multiplexed into a header of variable length coded video data, as described in detail later, in order to be transmitted to the MCU 10.

The picture data selected in the selector 48 and converted in the NTSC/CIF conversion circuit 50 are temporarily stored in one of memories in the memory part 34, and are fed to the source coding part 36. The source coding part 36 has a construction for performing a source coding algorithm recommended in CCITT recommendation H.261. Namely, the source coding part 36 includes a delay circuit 54, a motion compensation circuit 56, discrete cosine transform circuit 58, a multiplexer 60, a delay circuit 62, a quantizer 64, an inverse quantizer 66, and an inverse discrete cosine transform circuit 68. A selector 70 is provided for reading out a current picture from one of the memories in the memory part 34, and for feeding the current picture to the source coder. A selector 72 is provided for storing a previous picture reproduced in the source coder into one of memories in the memory part 34. A selector 74 is for reading out the previous picture corresponding to the current picture and for feeding the same to the source coder.

The system control unit 38 has a function 76 of restricting a picture rate by controlling the selector 48. When the selector 48 selects the grounded input, a null picture is stored in the memory part 34. The null picture causes little coded video data because picture-to-picture differences in null pictures is zero. Thus, if the selector 48 is controlled so as to select the picture data from the A/D converter 46 x times per second and to select the grounded input (30-x) times per second where 30 is a rate of coding operation of the source coder, a picture rate of x is obtained.

Meanwhile, the codec having the above construction can readily be diverted to a point-to-point videoconferencing system, by connecting another series of units 40, 42, 44 and 46 to another input of the selector 48 instead of being grounded. In the point-to-point videoconference, a picture of a selected person is input to one input of the selector 48, and a picture of a whole conference room is input to the other input of the selector 48.

Figure 4B:
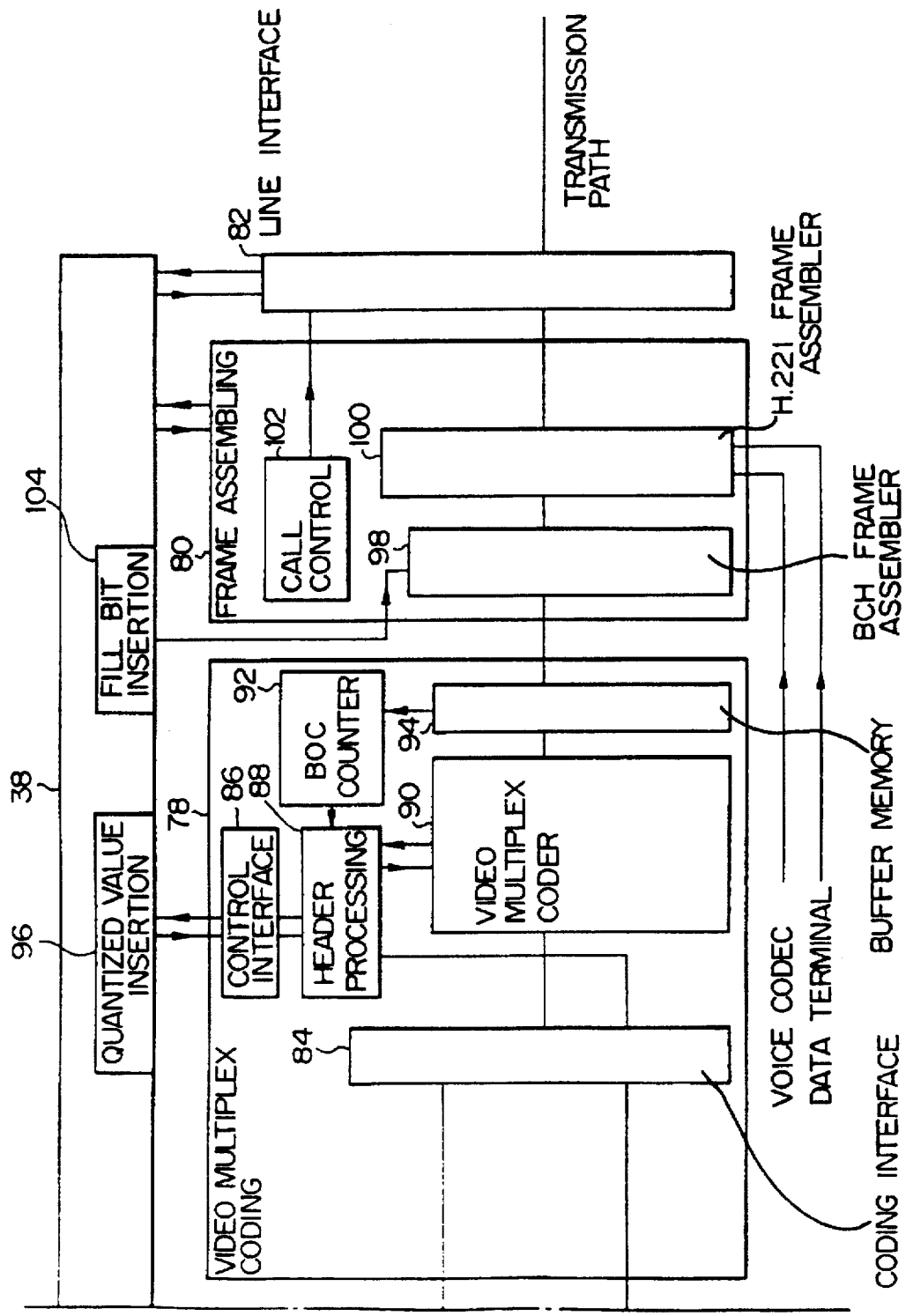

As shown in FIG. 4B, the coder side of the codec 26 further includes a video multiplex coding part 78, a frame assembling part 80, and a line interface 82.

The video multiplex coding part 78 includes: a coding interface 84 for providing an interface with the source coding part 36; a control interface 86 for providing an interface with the system control unit 38, a header processing unit 88; a video multiplex coder 90; a buffer occupation (BOC) counter 92; and a buffer memory 94.

The video multiplex coder 90 generates variable length codes from the output of the source coder, conforming to CCITT recommendation H.261, in cooperation with the header processing unit 88. The variable length codes generated in the video multiplex coder 90 are temporarily stored in the buffer memory 94. The BOC counter 92 counts BOC (Buffer Occupation), i.e., the content of the buffer memory 94, and communicates the BOC through the header processing unit 88 and the control interface 86 to the system control unit 38. The system control unit 38 controls step width in the quantizer 64 and the invert quantizer 66 (FIG. 4A) so that occupation in the buffer memory 94 is maintained at an adequate level. The system control unit 38 has a function 96 of inserting the quantized value obtained in the motion detection unit 52 into a header of the codes generated in the video multiplex coder 90 in order to transmit the quantized value to the MCU 10.

The frame assembling part 80 includes a BCH (Bose-Chaudhuric-Hocquenghen) frame assembler 98, an H.221 frame assembler 100 and a call control unit 102. The BCH frame assembler 98 assembles BCH frames from video data stored in the buffer memory 94 using a known BCH coding technique. The H.221 frame assembler 100 assembles transmission frames which conform to the H.221 recommendation and which include the BCH-coded video data, voice data output from a voice codec, and data communication data output from a data terminal. The call control unit 102 outputs control signals necessary for transmitting the video data.

According to the present invention, the system control unit 38 has a function 104 of inserting a controlled rate of fill bits into the BCH frames in order to control data rates of the video data. The BCH frame assembler 98 carries out a framing operation at a constant rate. Therefore, as a rate of the fill bits becomes large, the rate of video data taken out from the buffer memory 94 becomes small. Then, the BOC counted in the BOC counter 92 becomes large, and then generation of the video data is restricted by setting a wide step width at the quantizer 64 as mentioned before. Namely, the fill bit insertion function 104 performs control of the video data rate by inserting the fill bits at an adequate rate.

Figure 5:
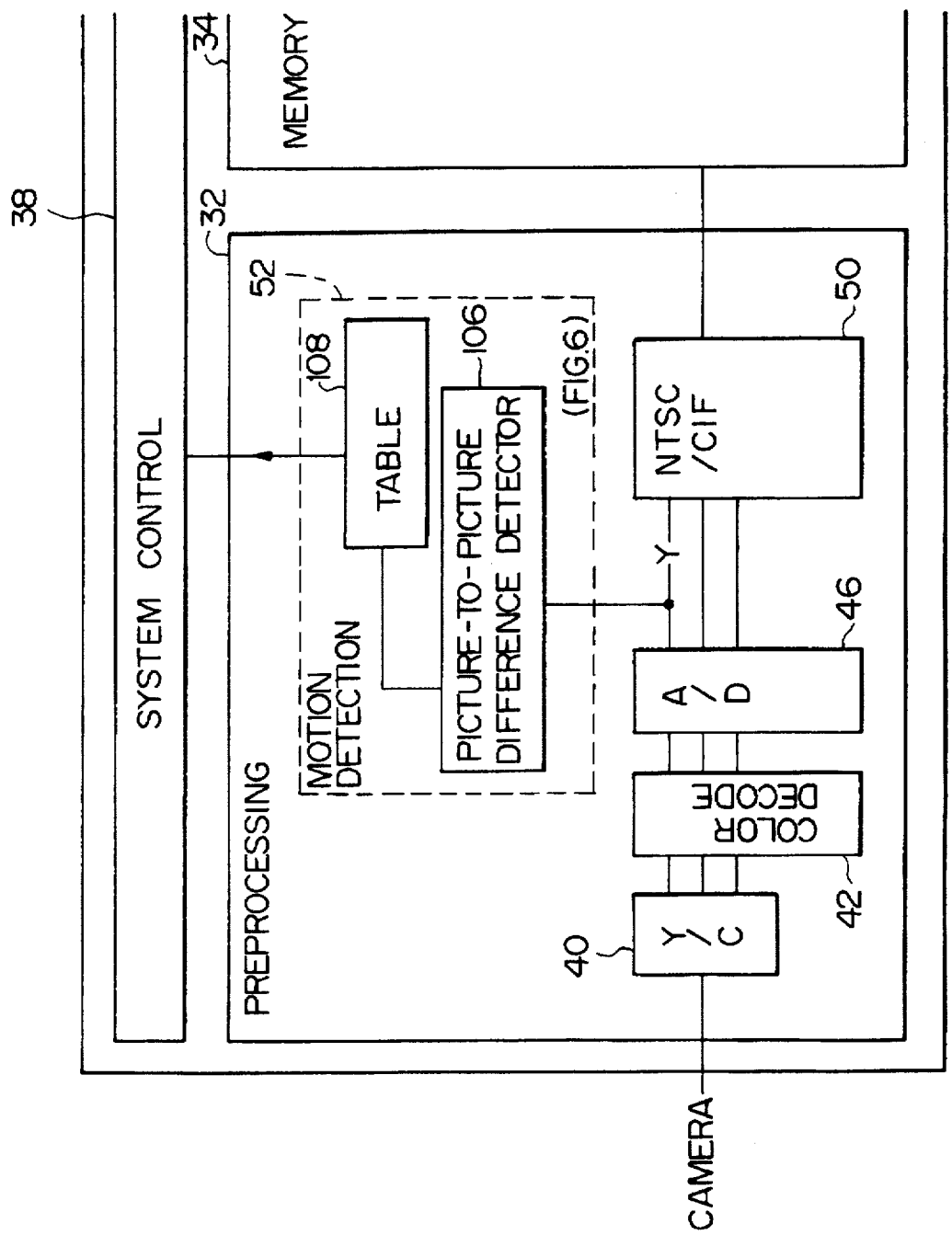
FIG. 5 is a block diagram showing a detailed construction of the motion detection unit 52 of FIG. 4A.

FIG. 5 shows a detailed construction of the motion detection unit 52, which includes a picture-to-picture difference detector 106 for detecting an amount of motion by summing the difference in the luminance signal output from the A/D converter 46 between two successive pictures over a whole picture, and a table 108 storing threshold values for quantizing the detected motion amount. The threshold values stored in the table 108 may have logarithmic spaces or may be equally spaced.

Figure 6:
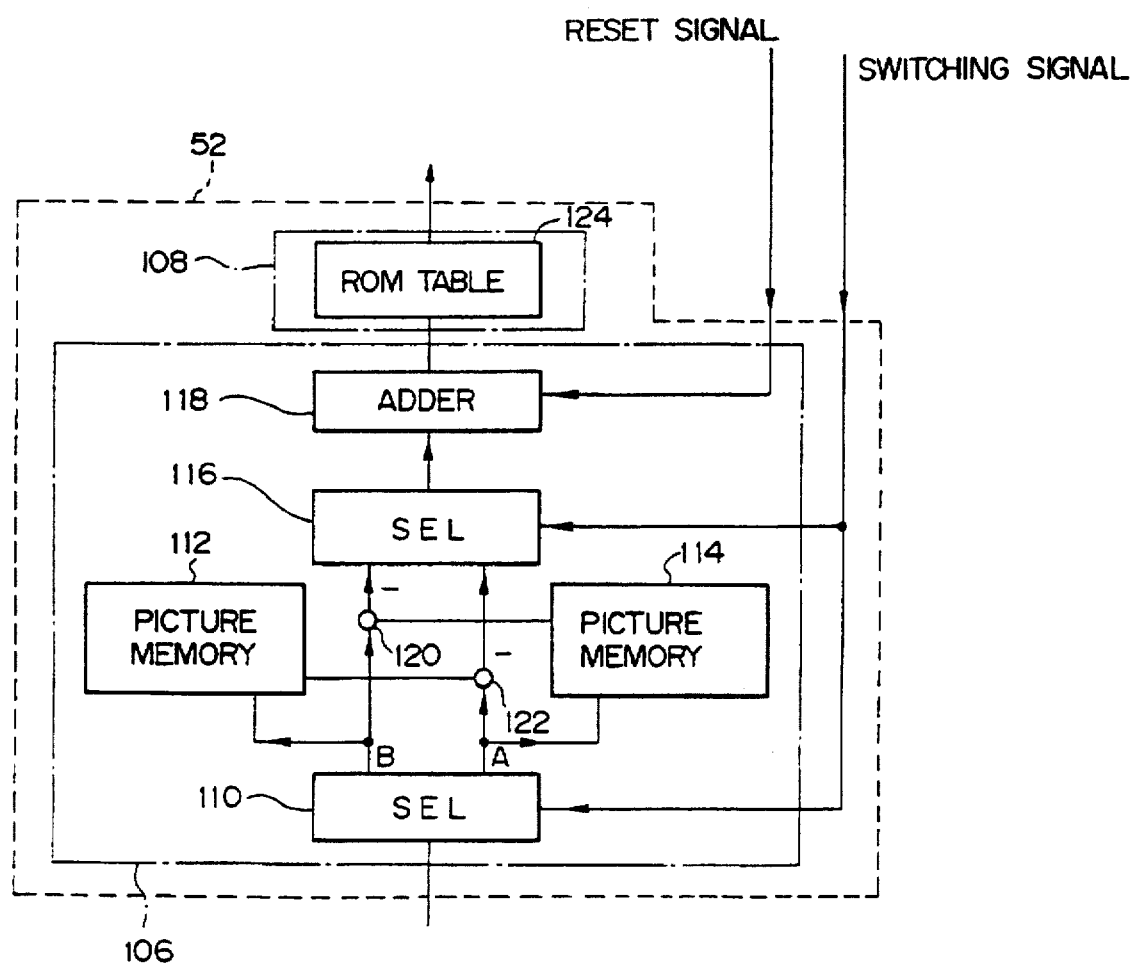
FIG. 6 is a block diagram showing a more detailed construction of the motion detection unit 52.
Figure 8A:
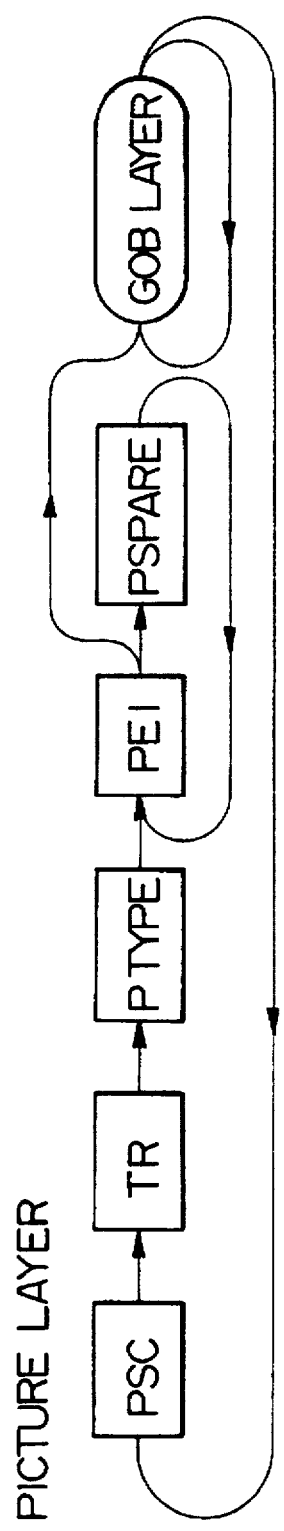
Figure 8B:
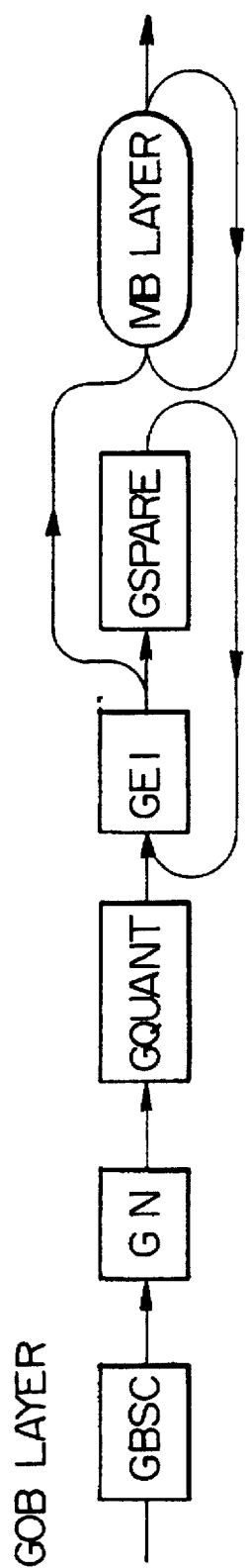

FIG. 6 shows a more detailed construction of the motion detection unit 52. The picture-to-picture difference detector 106 includes a selector (SEL) 110, two picture memories 112 and 114, a selector 116, and an adder 118, and subtracters 120 and 122. The table 108 includes a ROM table 124. According to a switching signal from the system control unit 38, the picture data (luminance data Y) are alternately stored in the picture memories 112 and 114. While the picture data input to the selector 110 are output at output A according to the switching signal, the difference in pixels between the current picture and a previous picture stored in the picture memory 112 is calculated in the subtracter 122, and the output of the subtracter 122 is selected in the selector 116 in order to be fed to the adder 118. Simultaneously, the current picture data are stored in the picture memory 114. In a period of the next picture, the next picture data is output at output B according to the switching signal, the difference in pixels between that picture and the picture stored in the picture memory 114 is calculated in the subtracter 120, and the difference output from the subtracter 120 is selected in the selector 116 in order to be fed to the adder 118. The adder 118 sums up the differences in each pixel over a whole picture, as an amount of motion in that picture. After the amount of motion in a picture has been calculated, one of values stored in the ROM table 124 is addressed by the output of the adder 118 to obtain a quantized value. After the output of the adder 118 has been used, the content of the adder 118 is reset by a reset signal to start summation of the differences regarding the next picture.

FIG. 7 shows a detailed construction of the MCU 10 according to the present invention. The MCU 10 includes a line interface 126, a frame disassembler 128, a voice decoder 130, a voice mixer 132, a controller 134, a time division multiplexer 136, voice delay unit 138, voice coder 140, a frame assembler 142, and an LSD (low speed data) switching unit 144. Received data (a) to (n) having the H.221 frame format are input through the line interface 126 to the frame disassembler 128, which separates them into voice data (a) to (n), video data (a) to (n), and LSD (low speed data) (a) to (n).

The voice data (a) to (n) are decoded into voice signals in the voice decoder 130, and the voice signals are mixed together to make mixed voices consisting of voices made in all points except the respective points themselves. The mixed voices are delayed in the voice delay unit 138 for synchronizing speaking motion of a person in the video signal with the voice the person makes the motions. The delayed voices are coded in the voice coder 140 into voice data (a) to (n), and the voice data (a) to (n) are input to the frame assembler 142. A voice comparator 146 may be preferably provided for determining a speaker by comparing voice levels in all of the voice signals. The determination result of the voice comparator 146 is notified to the controller 134.

The video data (a) to (n) are input to the time division multiplexer 136. The time division multiplexer 136 carries out a time division multiplexing processing so that pictures of all points except the point itself are distributed to each point.

Control lines connected between the frame assembler 128 and the controller 134 are used for bidirectionally transmitting information as to a rate of fill bits inserted in the BCH frame.

The quantized values $r$ representing the amount of motion in pictures are separated from the headers of the video data in the time division multiplexer 136, and are sent to the controller 134. The controller 134 determines shares $a$ of each point in transmitted video data, based on the determination of speaker and/or the quantized values that represent the amount of motion in each point, as described in detail later. The shares $a$ are multiplexed into headers of video data (a) to (n) that are distributed to each point, in the time division multiplexer 136.

The LSD (a) to (n) transmitted between data terminals provided at every point are switched in the LSD switching unit 144.

The frame assembler 142 assembles H.221 frames including voice data (a) to (n) output from the voice coder 140, video data (a) to (n) output from the time division multiplexer 136, and LSD from the LSD switching unit 144. The H.221 frames assembled in the frame assembler 142 are transmitted through the line interface 126 to all of the points.

According to the CCITT H.261 recommendation, the video data have a hierarchical structure with four layers, i.e., a picture layer, a GOB (group of blocks) layer, an MB (macroblock) layer and a block layer, as shown in FIGS. 8A to 8D, respectively. In the present invention, the quantized values $r$ transmitted from the visual telephone terminals to the MCU, and the shares $a$ transmitted from the MCU to the visual telephone terminal can be inserted in an area of spare information "PSPARE" of the picture layer of FIG. 8A, or an area of spare information "GSPARE" of the GOB layer of FIG. 8B.

Figure 9:
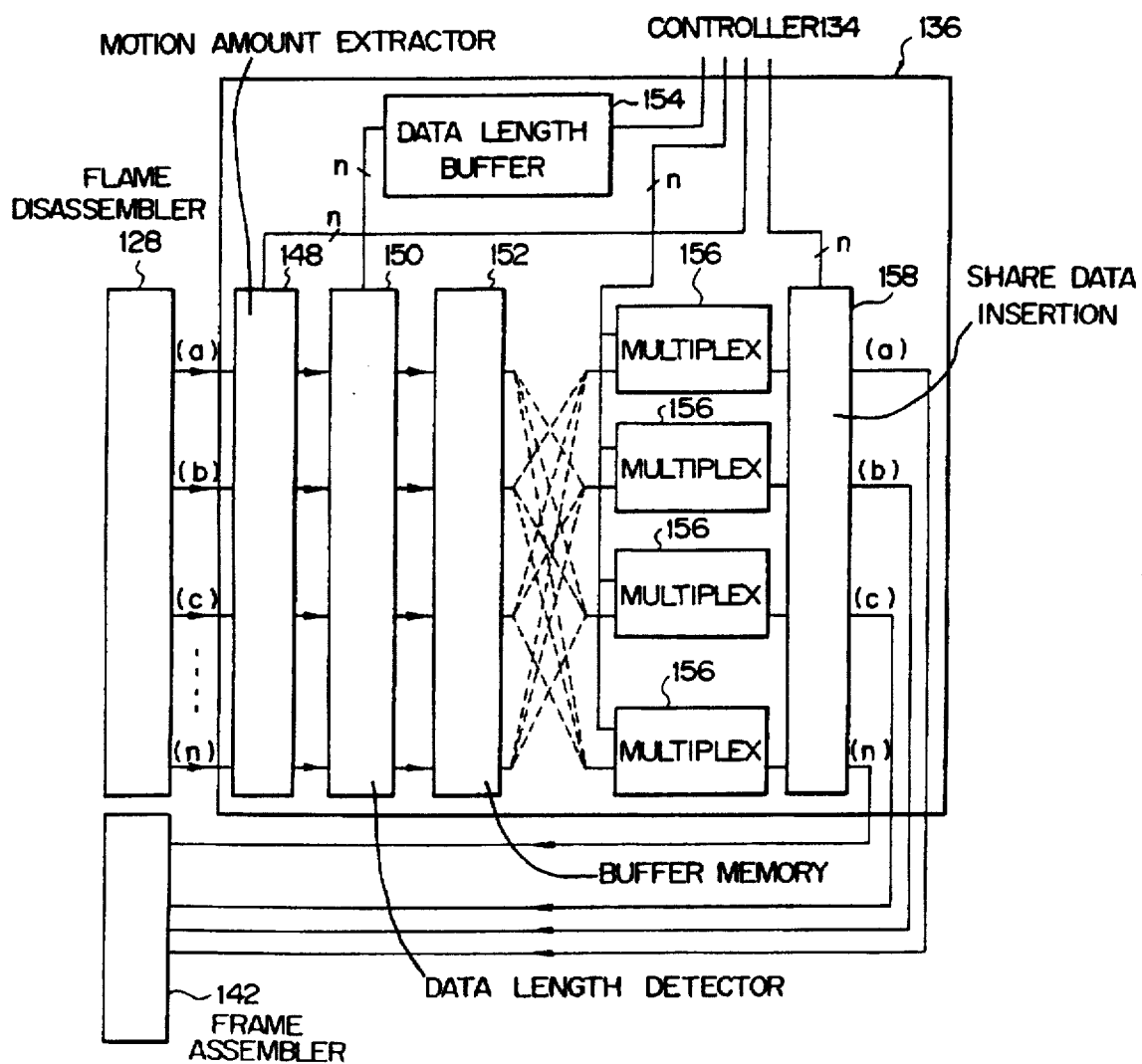
FIG. 9 is a block diagram showing a detailed construction of the time division multiplexer 136 of FIG. 7.

FIG. 9 shows a detailed construction of the time division multiplexer 136. The time division multiplexer 136 includes a motion amount extractor 148, a data length detector 150, a buffer memory 152, a data length buffer 154, multiplexers 156, and a share data insertion unit 158.

The motion amount extractor 148 extracts the quantized values $r$ stored in the spare information are a PSPARE or GSPARE of the video data of all channels (a) to (n). The quantized values $r$ are sent to the controller 134. The data length detector 150 detects data length in the picture layer or in the GOB layer when the data are written to the buffer memory 152, and stores the detected data length into the data length buffer 154. The data length buffer 154 may be included in the controller 134 instead of being included in the time division multiplexer 136. The controller 134 controls the multiplexers 156 so that video data are multiplexed on a picture layer basis or GOB layer basis by referring to the data length stored in the data length buffer 154. In the share data insertion unit 158, the share data $a$ determined in the controller 134 are inserted into the spare information area PSPARE or GSPARE of the multiplexed video data (a) to (n).

FIG. 10 shows a detailed construction of a decoder side of the codec 26. In FIG. 10A, the decoder side of the codec 26 includes a line interface 160, a frame disassembling part 162, and a video multiplex decoding part 164. The frame disassembling part 162 includes an H.221 frame disassembler 166, a BCH frame disassembler 168, and a call control unit 170, and extracts video data, voice data and data communication data from the received H.221 frame in an inverse operation of the frame assembling part 80 of FIG. 4B. The video multiplex decoding part 164 includes a buffer memory 172, a video multiplex decoder 174, a header processing unit 176, a control interface 178, and a decoding interface 180, and decodes the video data in an inverse operation of the video multiplex coding part 78 of FIG. 4B. According to an embodiment of the present invention, the system control unit 38 has a function 182 of reading out a control signal including information as to the share a according to which the system control unit 38 controls the picture rate and the data rate in the coder side as described previously.

Figure 10B:
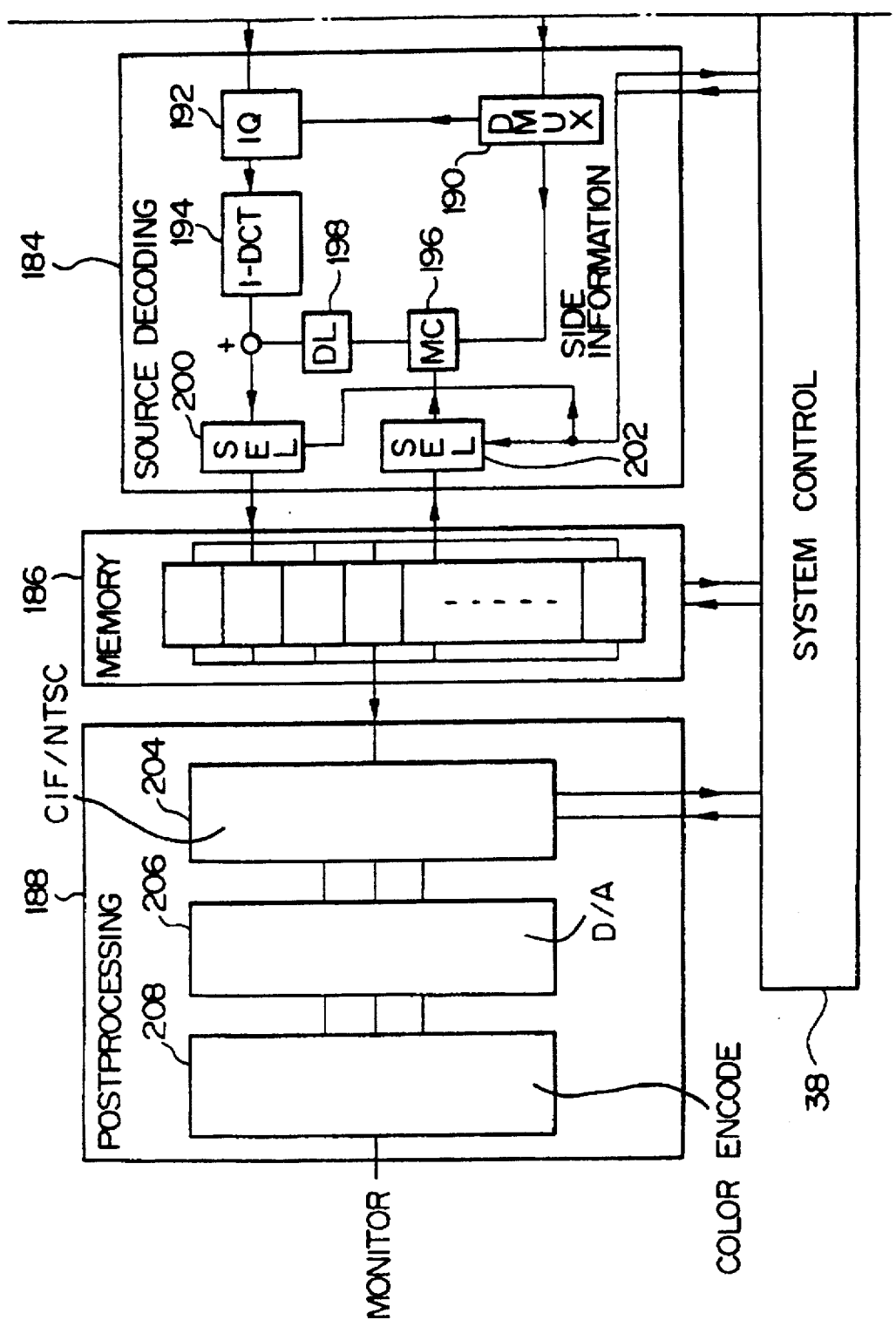

As shown in FIG. 10B, the decoder side of the codec 26 further includes a source decoding part 184, a memory part 186 and a postprocessing part 188. The source decoding part 184 includes a demultiplexer 190, an inverse quantizer 192, an inverse discrete cosine transform circuit 194, a motion compensation circuit 196, and a delay circuit 198, and performs an inverse operation of the source coding part 36 of FIG. 4A. A selector 200 is provided for storing a reproduced picture into one of the memories in the memory part 186. A selector 202 is provided for reading out a previous picture from one of memories in the memory part 186. The postprocessing part 188 includes a CIF/NTSC conversion circuit 204, a D/A converter 206 and a color encoder 208, and performs an inverse operation of the preprocessing part 32 of FIG. 4A. The postprocessing part 188 is constructed so that a composite picture consisting of pictures sent from the other visual telephone terminals is displayed on a television receiver or respective pictures sent from the other visual telephone terminals are displayed on respective television receivers.

As mentioned previously, in the first aspect of the present invention wherein the shares a are determined only based on voice levels, the MCU assigns a larger picture rate, e.g., 15 times per second and a larger data rate, e.g., one half of the total video data transmission rate to the speaker, and assigns a smaller picture rate, e.g., 7.5 times per second and a smaller data rate, e.g., a quarter of the total video data transmission rate to the previous speaker or the listener. In the second aspect of the present invention, the shares a are determined based on the voice level and/or the amount of motion.

In the case where the shares a are determined only based on the amount of motion in the second aspect of the present invention, the shares a are determined so as to be proportional to the respective quantized values r as much as possible and so that sum of shares of any (n−1) terminals does not exceed unity. For example, it is assumed that four visual telephone terminals 12, 14, 16 and 18 are connected to the MCU 10, as shown in FIG. 11. If quantized values transported in the spare information area PSPARE or GSPARE of the video data transmitted from the terminals 12, 14, 16 and 18 to the MCU 10 are $r_1$, $r_2$, $r_3$ and $r_4$, respectively, shares of terminals 12, 14, 16 and 18: $a_1$, $a_2$, $a_3$ and $a_4$, respectively, are calculated in controller 134 of the MCU 10 according to the following formulae:

$$a_1 = \mathrm{Min}\left(\frac{r_1}{r_1+r_3+r_4}, \frac{r_1}{r_1+r_2+r_4}, \frac{r_1}{r_1+r_2+r_3}\right)$$

$$a_2 = \mathrm{Min}\left(\frac{r_2}{r_2+r_3+r_4}, \frac{r_2}{r_1+r_2+r_4}, \frac{r_2}{r_1+r_2+r_3}\right)$$

$$a_3 = \mathrm{Min}\left(\frac{r_3}{r_2+r_3+r_4}, \frac{r_3}{r_1+r_3+r_4}, \frac{r_3}{r_1+r_2+r_3}\right)$$

$$a_4 = \mathrm{Min}\left(\frac{r_4}{r_2+r_3+r_4}, \frac{r_4}{r_1+r_3+r_4}, \frac{r_4}{r_1+r_2+r_4}\right)$$

Figure 13:
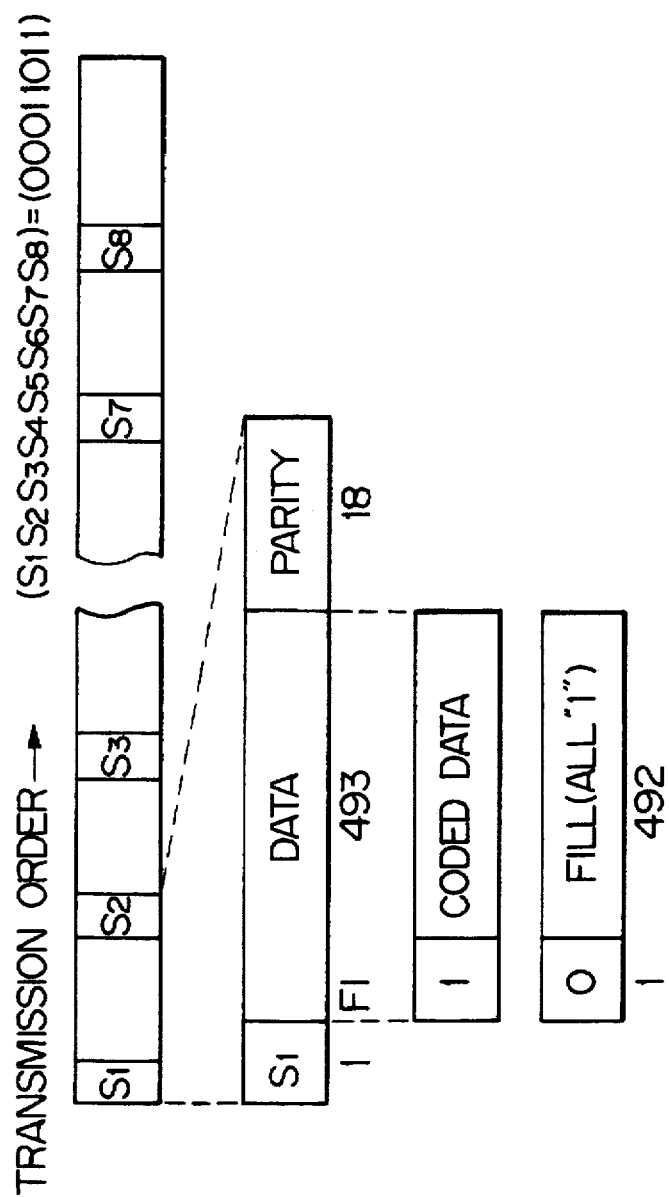
FIG. 13 is a diagram explaining insertion of fill bits into video data.

Values of $a_i$ (i=1 to 4) are transported in the spare information area PSPARE or GSPARE of the video data transmitted from the MCU to every terminal. The system control unit 38 in the visual telephone terminal reads out the values of $a_i$ from the received video data using the control signal reading function 182. The system control unit 38 determines the picture rate from the share $a_i$ according to table data as shown in FIG. 12. The system control unit 38 also determines a rate $m_i$ of fill bits from the share $a_i$ according to the following formula.

$$m_i = V/\{(1-a_i) \times 512\}$$

where V is a transmission rate assigned to the video data. V is represented as $$V = S-A-D-F$$

where S is a transmission rate of the H.221 frame, A is a transmission rate assigned to the voice data, D is a transmission rate assigned to the data communication data, and F is a transmission rate of headers of the H.221 frame. The value 512 in the above formula corresponds to a bit length of a BCH frame, as shown in FIG. 13. In FIG. 13, eight BCH frames constitute a multiframe which can be distinguished by a fixed pattern 00011011 of eight S bits located at the front of each BCH frame. Each S bit is followed by a 493-bit data area and an 18-bit error correction bit area, and these total 512 bits. A fill indicator $F_i$ is located at the head of the data area in order to distinguish fill bits from the coded video data.

Figure 14:
FIG. 14 is a diagram showing an example of insertion of fill bits.

If the share $a_i$ is 0.5, the coded video data and the fill bits are alternately inserted as shown in FIG. 14.

The case where the shares $a_i$ are determined based on the voice level and the amount of motion in the second aspect of the present invention, is explained next. In the first step, a larger share is assigned to the speaker determined from the voice levels. For example, a half share is assigned to the speaker determined from the voice levels and quarter shares are assigned to two listeners. In second step, the shares are shifted according to the quantized values $r_i$, and so that sum of shares $a_i$ of any three terminals does not exceed unity.

We claim:

1. A method of adaptively controlling a multipoint videoconferencing system including a plurality of visual telephone terminals and a multipoint control unit connected to the plurality of visual telephone terminals, comprising the steps of:

a) determining respective shares of the plurality of visual telephone terminals;

b) generating respective video data of moving pictures in the plurality of visual telephone terminals at data rates corresponding to the respective, determined shares of the visual telephone terminals;

c) distributing the respective video data generated in each visual telephone terminal to the others of the plurality of visual telephone terminals; and the step (b) further comprising the substeps of:
  i) generating pictures at picture rates defined by the shares of the respective visual telephone terminals,
  ii) generating the video data from the pictures at video data rates defined by the shares of the respective visual telephone terminals, and
  iii) in the substep i), continuously selecting one of an actual picture and a null picture so that the actual picture is selected at the picture rate, thereby to generate the pictures substantially at the picture rate.

2. A method as claimed in claim 1, wherein in the substep ii), the generation of the video data is controlled by inserting null data in an amount which is defined by the by the video data rate, to thereby substantially generate the video data at the video data rate.

3. A method as claimed in claim 1, wherein the step a) includes the substeps of:
  i) detecting respective amounts of motion of persons at the plurality of visual telephone terminals; and
  ii) calculating the respective shares of the plurality of visual telephone terminals from the respective motion amounts detected at the visual telephone terminals.

4. A method as claimed in claim 3, wherein in the substep ii), the shares are determined so as to be substantially proportional to the motion amount at the respective visual telephone terminals.

5. A method as claimed in claim 4, wherein values of the motion amount are transported on the video data transferred from the visual telephone terminals to the multipoint control unit, and values of the shares are transported on the video data transferred from the multipoint control unit to the visual telephone terminals.

6. A method as claimed in claim 1, wherein the step a) includes the substeps of:
  comparing levels of voices made in the visual telephone terminals;
  determining a first visual telephone terminal where a speaker exists and second visual telephone terminals where the speaker does not exist, based on the comparison result of the voice levels;
  assigning a first share to the first visual telephone terminal; and
  assigning second shares smaller than the first share to the second visual telephone terminals.

7. A method as claimed in claim 1, wherein the step a) includes the substeps of:
  comparing levels of voices at the visual telephone terminals;
  determining a visual telephone terminal where a speaker exists, based on the comparison result of the voice levels;
  detecting an amount of motion of persons at the respective visual telephone terminals; and
  determining the share for the respective visual telephone terminals, based on the determination of the visual telephone terminal where the speaker exists, and the motion amount detected at the visual telephone terminals.

8. A method as claimed in claim 1, wherein the step c) includes the substeps of:
  transmitting the video data from the visual telephone terminals to the multipoint control unit;
  multiplexing the video data transmitted from the visual telephone terminals, in the multipoint control unit; and
  transmitting the multiplexed video data from the multipoint control unit to the visual telephone terminals.

9. A multipoint videoconferencing system including a plurality of visual telephone terminals and a multipoint control unit connected to the plurality of visual telephone terminals, comprising:
  means for determining shares of the respective visual telephone terminals;
  means for generating video data of moving pictures in the respective visual telephone terminals at data rates corresponding to the respective shares of the visual telephone terminals, as determined by the determining means;
  means for distributing the video data, generated by the generating means in each of the visual telephone terminals, to the others of the plurality of visual telephone terminals;
  the video data generating means further comprising:
    means for generating pictures at picture rates defined by the shares of the respective visual telephone terminals, and
    means for generating the video data from the pictures at video data rates defined by the shares of the respective visual telephone terminals; and
  the picture generating means further comprising:
    a selector for selecting one of an actual picture and a null picture at a constant rate, and
    means for continuously controlling the selector so that the actual picture is selected at the picture rate, to thereby substantially generate the pictures at the picture rate.

10. A system as claimed in claim 9, wherein the video data generating means includes:
  a coder for coding the picture into a variable amount of video data;
  a buffer for storing the video data output from the coder;
  means for adding null data, an amount of which is defined by the video data rate, to video data taken out from the buffer to make video data having a constant rate; and
  means for controlling the amount of video data coded in the coder so that occupation of the buffer is maintained.

11. A system as claimed in claim 9, wherein the share determining means includes:
  means for detecting an amount of motion of persons at the respective visual telephone terminals; and
  means for calculating the shares of the respective visual telephone terminals from the motion amount detected by the detecting means.

12. A system as claimed in claim 11, wherein the share calculating means determines the shares so as to be substantially proportional to the motion amount.

13. A system as claimed in claim 12, further comprising means for inserting values of motion amount into the video data transferred from the visual telephone terminals to the multipoint control unit, and means for inserting values of the shares into the video data transferred from the multipoint control unit to the visual telephone terminals.

14. A system as claimed in claim 9, wherein the share determining means includes:
  means for comparing levels of voices at the visual telephone terminals;
  means for determining a first visual telephone terminal where a speaker exists and second visual telephone terminals where the speaker does not exist, based on the comparison result of the comparing means; and
  means for assigning a first share to the first visual telephone terminal, and for assigning second shares smaller than the first share to the second visual telephone terminals.

15. A system as claimed in claim 9, wherein the share determining means includes:
    means for comparing levels of voices at the visual telephone terminals;
    first means for determining a visual telephone terminal where a speaker exists, based on the comparison result of the comparing means;
    means for detecting amount of motion of persons at the respective visual telephone terminals; and
    second means for determining the shares of the respective visual telephone terminals, based on the determination for the first determining means, and the motion amount detected by the detecting means.

16. A system as claimed in claim 9, wherein the distributing means includes:
    first means for transmitting the video data transmitted by the transmitting means in the multipoint control unit;
    means for multiplexing the video data transmitted by the transmitting means in the multipoint control unit; and
    second means for transmitting the multiplexed video data by the multiplexing means to the visual telephone terminals.

17. A visual telephone terminal for use in a multipoint videoconferencing system, including a multipoint control unit connected to the visual telephone terminal and other visual telephone terminals connected to the multipoint control unit, comprising:
    means for receiving a share determined in the multipoint control unit;
    means for generating video data according to the share received by the receiving means;
    means for transmitting the video data generated by the generating means to the multipoint control unit;
    means for receiving video data generated in the other visual telephone terminals and multiplexed in the multipoint control unit, from the multipoint control unit;
    the means for generating video data further comprising:
        means for generating pictures at picture rates defined by the share, and
        means for generating the video data from the pictures at a video data rate defined by the share; and the picture generating means further comprising:
        a selector for selecting one of an actual picture and a null picture at a constant rate, and
        means for continuously controlling the selector so that the actual picture is selected at the picture rate, to thereby substantially generate the pictures at the picture rate.

18. A visual telephone terminal as claimed in claim 17, wherein the video data generating means includes:
    a coder for coding the pictures into a variable amount of video data;
    a buffer for storing the video data output from the coder;
    means for adding null data, an amount of which is defined by the video data rate, to video data taken out from the buffer to make video data having a constant rate; and
    means for controlling the amount of video data coded in the coder so that occupation of the buffer is maintained.

19. A visual telephone terminal as claimed in claim 17, further comprising:
    means for detecting an amount of motion of a person; and
    means for transmitting the motion amount detected by the detecting means to the multipoint control unit.

20. A method of adaptively controlling a multipoint videoconferencing system including a plurality of visual telephone terminals and a multipoint control unit connected to the plurality of visual telephone terminals, comprising the steps of:
    a) determining respective shares of the plurality of visual telephone terminals;
    b) generating respective video data of moving pictures in the plurality of visual telephone terminals at data rates corresponding to the respective, determined shares of the visual telephone terminals;
    c) distributing the respective video data generated in each visual telephone terminal to the others of the plurality of visual telephone terminals; and
    d) performing (the step b) in accordance with the substeps of:
        i) generating pictures at picture rates defined by the shares of the respective visual telephone terminals, and
        ii) generating the video data from the pictures at video data rates defined by the shares of the respective visual telephone terminals, wherein in the substep ii), the generation of the video data is controlled by inserting null data in an amount which is defined by the video data rate, to thereby substantially generate the video data at the video data rate.

21. A method as claimed in claim 20, wherein the step a) includes the substeps of:
    i) detecting respective amounts of motion of persons at the plurality of visual telephone terminals; and
    ii) calculating the respective shares of the plurality of visual telephone terminals from the respective motion amounts detected at the visual telephone terminals.

22. A method as claimed in claim 21, wherein in the substep ii), the respective shares are determined so as to be substantially proportional to the respective motion amounts detected at the plurality of visual telephone terminals.

23. A method as claimed in claim 22, wherein values of the respective motion amounts are transported on the corresponding video data transferred from the plurality of visual telephone terminals to the multipoint control unit, and the respective values of the shares are transported on the corresponding video data transferred from the multipoint control unit to the plurality of visual telephone terminals.

24. A method as claimed in claim 20, wherein the step a) includes the substeps of:
    comparing levels of voices made in the visual telephone terminals;
    determining a first visual telephone terminal where a speaker exists and second visual telephone terminals where the speaker does not exist, based on the comparison result of the voice levels;
    assigning a first share to the first visual telephone terminal; and
    assigning second shares smaller than the first share to the second visual telephone terminals.

25. A method as claimed in claim 20, wherein the step a) includes the substeps of:
    comparing levels of voices at the visual telephone terminals;
    determining a visual telephone terminal where a speaker exists, based on the comparison result of the voice levels;
    detecting an amount of motion of persons at the respective visual telephone terminals; and determining the share for the respective visual telephone terminals, based on the determination of the visual telephone terminal where the speaker exists, and the motion amount detected at the visual telephone terminals.

26. A method as claimed in claim 20, wherein the step c) includes the substeps of:

transmitting the video data from the visual telephone terminals to the multipoint control unit;

multiplexing the video data transmitted from the visual telephone terminals, in the multipoint control unit; and transmitting the multiplexed video data from the multipoint control unit to the visual telephone terminals.

27. A multipoint videoconferencing system including a plurality of visual telephone terminals and a multipoint control unit connected to the plurality of visual telephone terminals, comprising:

means for determining shares of the respective visual telephone terminals;

means for generating video data of moving pictures in the respective visual telephone terminals at data rates corresponding to the respective shares of the visual telephone terminals, as determined by the determining means;

means for distributing the video data, generated by the generating means in each of the visual telephone terminals, to the others of the plurality of visual telephone terminals, wherein the video data generating means includes:

means for generating pictures at picture rates defined by the shares of the respective visual telephone terminals; and means for generating the video data from the pictures at video data rates defined by the shares of the respective visual telephone terminals, wherein the video data generating means includes:

a coder for coding the picture into a variable amount of video data;

a buffer for storing the video data output from the coder;

means for adding null data, an amount of which is defined by the video data rate, to video data taken out from the buffer to make video data having a constant rate; and means for controlling the amount of video data coded in the coder so that occupation of the buffer is maintained.

28. A system as claimed in claim 27, wherein the share determining means includes:

means for detecting an amount of motion of persons at the respective visual telephone terminals; and means for calculating the shares of the respective visual telephone terminals from the motion amount detected by the detecting means.

29. A system as claimed in claim 28, wherein the share calculating means determines the shares so as to be substantially proportional to the motion amount.

30. A system as claimed in claim 29, further comprising means for inserting values of motion amount into the video data transferred from the visual telephone terminals to the multipoint control unit, and means for inserting values of the shares into the video data transferred from the multipoint control unit to the visual telephone terminals.

31. A system as claimed in claim 27, wherein the share determining means includes:

means for comparing levels of voices at the visual telephone terminals;

means for determining a first visual telephone terminal where a speaker exists and second visual telephone terminals where the speaker does not exist, based on the comparison result of the comparing means; and means for assigning a first share to the first visual telephone terminal, and for assigning second shares smaller than the first share to the second visual telephone terminals.

32. A system as claimed in claim 27, wherein the share determining means includes:

means for comparing levels of voices at the visual telephone terminals;

first means for determining a visual telephone terminal where a speaker exists, based on the comparison result of the comparing means;

means for detecting amount of motion of persons at the respective visual telephone terminals; and second means for determining the shares of the respective visual telephone terminals, based on the determination for the first determining means, and the motion amount detected by the detecting means.

33. A system as claimed in claim 27, wherein the distributing means includes:

first means for transmitting the video data transmitted by the transmitting means in the multipoint control unit;

means for multiplexing the video data transmitted by the transmitting means in the multipoint control unit; and second means for transmitting the multiplexed video data by the multiplexing means to the visual telephone terminals.

34. A visual telephone terminal for use in a multipoint videoconferencing system, including a multipoint control unit connected to the visual telephone terminal and other visual telephone terminals connected to the multipoint control unit, comprising:

means for receiving a share determined in the multipoint control unit;

means for generating video data of a moving picture at a data rate corresponding to the share received by the receiving means;

means for transmitting the video data generated by the generating means to the multipoint control unit; and means for receiving video data generated in the other visual telephone terminals and multiplexed in the multipoint control unit, from the multipoint control unit, wherein the video data generating means includes:

means for generating pictures at picture rates defined by the share; and means for generating the video data from the pictures at a video data rate defined by the share, wherein the video data generating means includes:

a coder for coding the pictures into a variable amount of video data;

a buffer for storing the video data output from the coder;

means for adding null data, an amount of which is defined by the video data rate, to video data taken out from the buffer to make video data having a constant rate; and means for controlling the amount of video data coded in the coder so that occupation of the buffer is maintained.

35. A visual telephone terminal as claimed in claim 34, further comprising:

means for detecting an amount of motion of a person; and means for transmitting the motion amount detected by the detecting means to the multipoint control unit.

* * * * *

UNITED STATES PATENT AND TRADEMARK OFFICE
CERTIFICATE OF CORRECTION

PATENT NO. : 5,684,527
DATED : November 4, 1997
INVENTOR(S) : TERUI et al.

It is certified that error appears in the above-identified patent and that said Letters Patent is hereby corrected as shown below:

Col. 11, line 24, after "the" insert --respective--;
line 25, after "to the" insert --respective--, change "amount" to --amounts detected" and change "respective" to --plurality of--;
line 27, after "of the" insert --respective--;
line 28, change "amount" to --amounts-- and after "on the "insert --corresponding--;
line 29, after "from the" insert --plurality of--;
line 30, after "and" insert --the respective-- and after "on the" insert --corresponding--;
line 31, after "to the" insert --plurality of--.

Signed and Sealed this

Twenty-fourth Day of February, 1998

Attest:

BRUCE LEHMAN

*Attesting Officer*    *Commissioner of Patents and Trademarks*